July 25, 1939.   A. L. FREEDLANDER   2,167,384
BELT
Filed Dec. 22, 1937   3 Sheets-Sheet 1
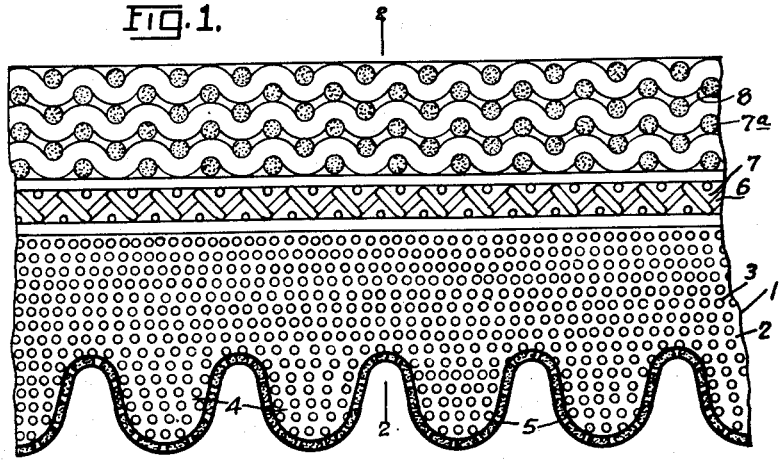
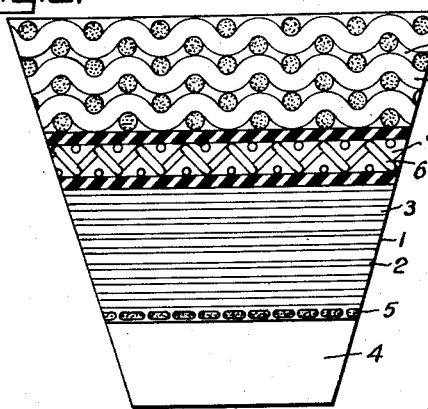
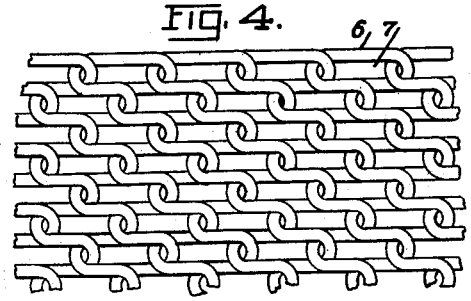
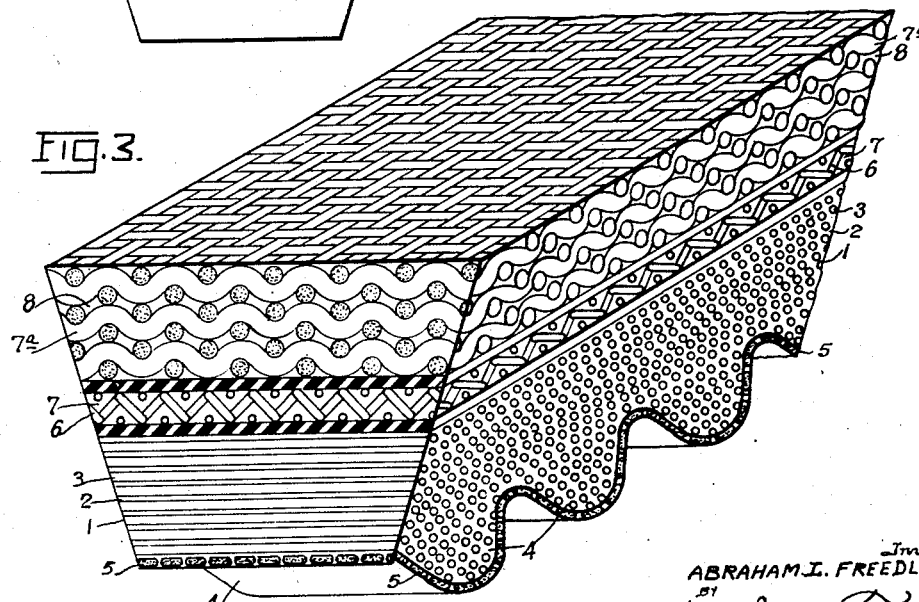
Inventor
ABRAHAM L. FREEDLANDER.
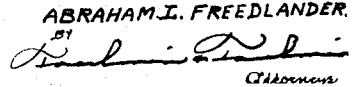
Attorneys July 25, 1939. A. L. FREEDLANDER 2,167,384
BELT
Filed Dec. 22, 1937 3 Sheets-Sheet 2
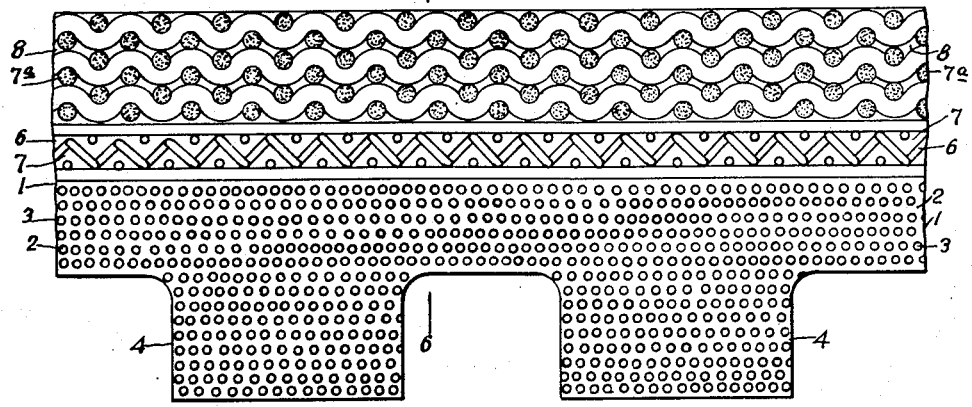
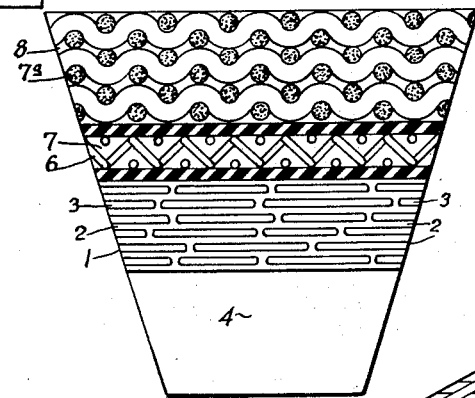
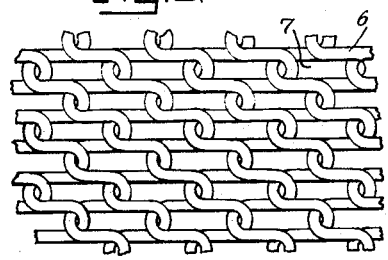
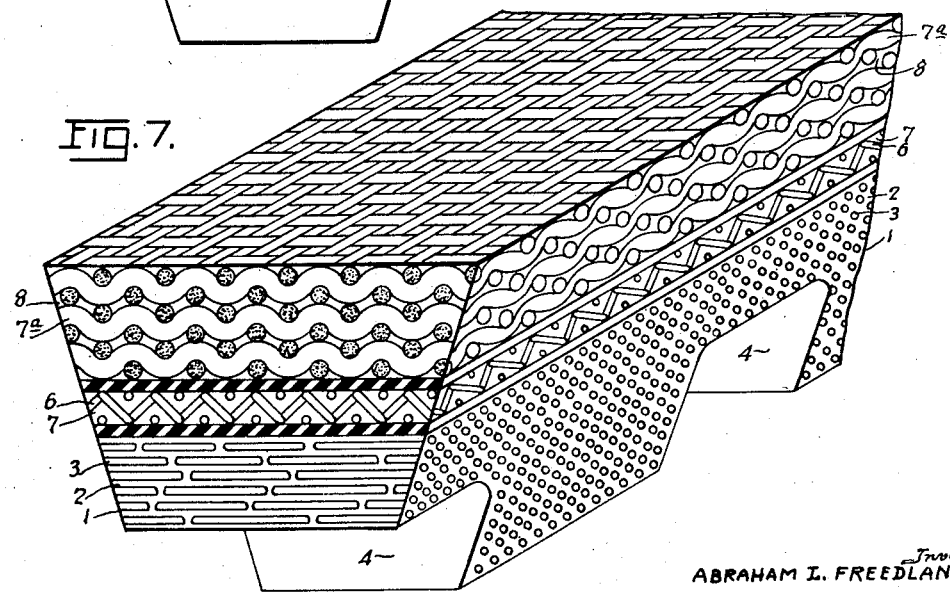
ABRAHAM L. FREEDLANDER, *Inventor*
Attorneys July 25, 1939.  A. L. FREEDLANDER  2,167,384

BELT

Filed Dec. 22, 1937   3 Sheets-Sheet 3

Inventor
ABRAHAM L. FREEDLANDER
Attorneys

Patented July 25, 1939

2,167,384

UNITED STATES PATENT OFFICE 2,167,384

BELT

Abraham L. Freedlander, Dayton, Ohio, assignor to The Dayton Rubber Manufacturing Company, Dayton, Ohio, a corporation of Ohio Application December 22, 1937, Serial No. 181,192

5 Claims. (Cl. 74—237)

My invention relates to belts.

It is the object of my invention to provide a belt having one or more layers of metal mesh fabric, which constitute an inextensible axis in the belt, and to provide in association therewith a laterally incompressible rubber belt which is longitudinally inextensible or compressible.

In particular, it is desired to provide such a body, either above or below the neutral axis, or both, consisting of rubber or synthetic rubber having a plurality of fine textile fibers arranged transversely of the belt. These fibers, when embedded in the rubber or synthetic rubber, lie parallel to one another transversely of the belt. They are laterally incompressible, but not longitudinally incompressible. They resist the lateral compressibility of the rubber while permitting the belt to compress in its compression section and to stretch in its tension section. The metal mesh permits of the free flow of the rubber between the links of the mesh so that there is no deformation of the belt when it passes around a small pulley.

The lateral incompressibility of the textile fibers prevents the lateral collapse of the belt, so that any tendency of the rubber to be displaced when passing around a small pulley will be accommodated by the flow of the rubber through the mesh of the inextensible neutral axis of the wire mesh.

It is a further object to provide this belt in combination with either straight laid or bias laid and rubber embedded fabric members constituting either the tension or compression section.

It is an object to provide such a belt either with or without a cover or with teeth or sheared teeth molded therewith.

Referring to the drawings:

Figure 1 is a side elevation of a section of the belt;

Figure 2 is a section on the line 2—2 of Figure 1;

Figure 3 is a perspective of the belt;

Figure 4 is a detailed greatly enlarged view of the metal mesh showing the large openings through which the rubber can flow vertically without any sacrifice of the longitudinal inextensibility of the belt;

Figure 5 is a side elevation of a sheared tooth type of belt;

Figure 6 is a section on the line 6—6 of Figure 5;

Figure 7 is a perspective of the belt of Figures 5 and 6;

Figure 8 is a plan view of the metal mesh used in this type of belt;

Figure 9:
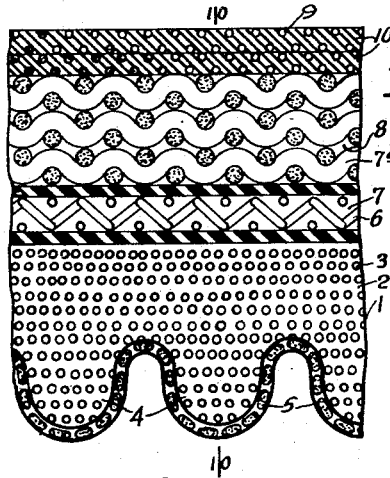
Figure 9 is a vertical section of a wrapped belt. This section is taken on the line 9—9 of Figure 10.
Figure 12:
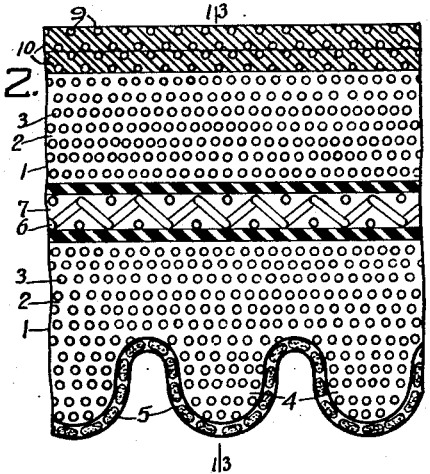
Figure 12 is a vertical section through the belt with fine fibers being used both above and below the neutral axis.
Figure 10:
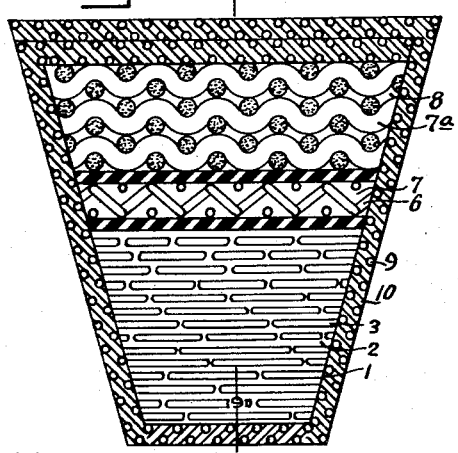
Figure 10 is a section on the line 10—10 of Figure 9.
Figure 13:
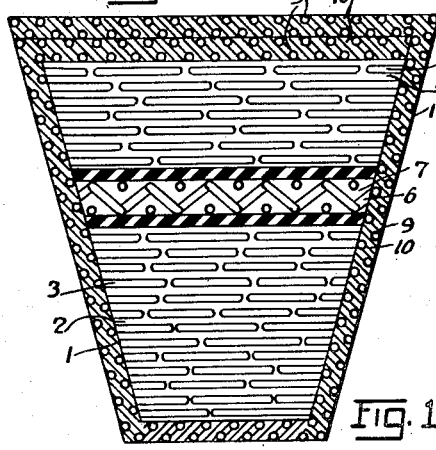
Figure 13 is a vertical section on the line 13—13 of Figure 12.
Figure 11:
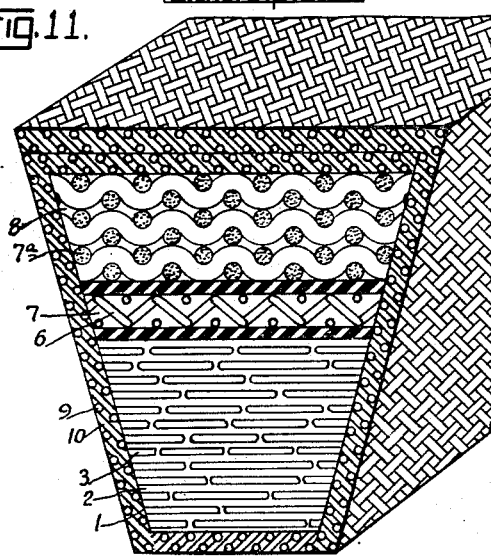
Figure 11 is a perspective of the wrapped belt.
Figure 14:
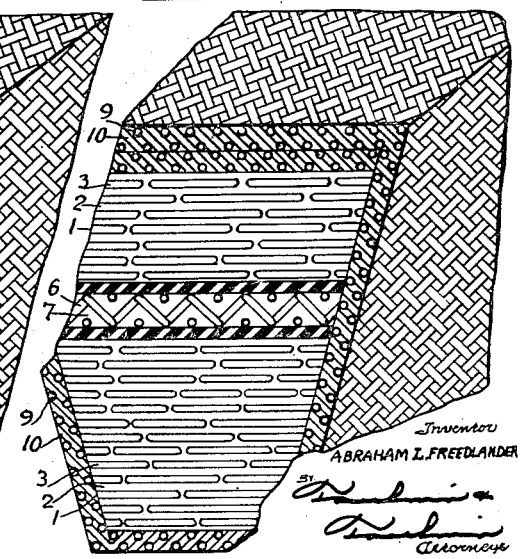
Figure 14 is a perspective of the belts of Figures 12 and 13.

Due to the difficulty of illustrating belt materials, it will be understood that the textile fibers which are indicated by circles and rods are in practice very fine and require for their careful examination, magnification.

It will be further understood that the other materials have been likewise exaggerated in size in order to illustrate them and for the purpose of clarity, the cross section of rubber has been omitted.

Referring to the drawings in detail, 1 indicates a compression section consisting of a rubber or synthetic rubber body 2 having transversely arranged parallel fine textile fibers 3. This belt may be a plain trapezoid belt or not, having molded teeth 4 with an inner layer of fabric 5.

The neutral axis consists of a metal mesh layer, or layers, 6 having relatively large openings 7 therein to permit of the free vertical flow and deformation of the rubber. This insures the functioning of the belt as a unit without distortion of the belt, without setting up excessive heat and without causing the rubber, which is vulcanized to the metal mesh, to become separated therefrom.

Heretofore rubber, when associated with metal, has separated from the metal because it was not appreciated that the metal prevented the free flow of the rubber, as it is inevitably deformed.

In this instance, the metal mesh is composed of transversely interlooped strands the loops of each strand being arranged in zig-zag form, whereby the mesh is longitudinally inextensible but bendable transversely so that the belt can pass easily around a small pulley. The rubber when so compressed or extended can move vertically through the mesh without any difficulty. The fine textile fibers above or below the neutral axis mesh 6, or on both sides of it, provide against longitudinal compressibility. Such an arrangement insures uniform cross section of the belt, which is essential to accurate and satisfactory driving by such a belt.

The multiple layers, or straight laid fibers 7ᵃ, which are embedded in the rubber 8, give further strength and body to the belt, and are laterally incompressible with longitudinal inextensibility or compressibility.

Such a belt may have its teeth 4 either molded or sheared prior to vulcanization or after vulcanization. When the teeth are sheared, as shown in Figures 5, 6 and 7, the arrangement of the fibers transversely of the belt eliminates any shearing of the fabric which would otherwise lose its strength by being sheared, as each one of these transverse textile fibers are definitely independent, one of the other. The shearing of the teeth, or the molding of them to permit of more ready movement of the belt around a small pulley, does not effect the characteristics of the compression section of the belt.

The same would be true of the tension section, when and as the teeth are sheared in it, which is occasionally necessary in certain types of belts.

Where it is desired to give to the belt further protection or uniform cross section, or to give it a better appearance for those who prefer a belt with a cover, then a cover of combined textile material 9 and rubber 10 is wrapped around the belt and vulcanized thereto. Such a cover does not impede the functioning of the belt as heretofore described. There is the same free flow of the material composing the belt, and the same longitudinal inextensibility of the metal mesh and the lateral incompressibility due to the transversely arranged fine fibers or fabric layers, or both.

It will be understood that I desire to comprehend within my invention such modifications as may be necessary to adapt it to varying conditions and uses.

Having thus fully described my invention, what I claim as new and desire to secure by Letters Patent, is:

1. In combination, in a belt a compression section of rubber and transversely arranged parallel fine fibers of textile material to render the section laterally incompressible and longitudinally compressible, a flexible metal mesh band composed of transversely interlooped strands the loops of each strand being arranged in zig-zag form, said band being disposed along the neutral axis of said belt which band is longitudinally inextensible but freely flexible about an axis transverse thereto and adapted to permit the free flow of rubber vertically therethrough, and a tension section of reinforced rubber above said neutral axis section, said tension section having a plurality of rubber embedded fabric layers therein.

2. In combination in a belt, of a neutral axis formed of an articulated metal mesh band composed of transversely interlooped strands the loops of each strand being arranged in zig-zag form, said band being embedded in rubber, said metal mesh band extending throughout the entire length and width of the belt, and tension and compression sections formed of rubber and reinforced by textile material, at least one of such sections having textile material consisting of fine fibers arranged in parallel, transversely of the belt and embedded in rubber, said section being formed into teeth.

3. In a V-shaped belt, a neutral axis section comprising an articulated metal mesh band composed of transversely interlooped strands the loops of each strand being arranged in zig-zag form, said band having interstices sufficiently large to permit the deformation and flow of rubber therethrough and there around, a rubber body vulcanized within and on either side of said mesh to form compression and tension sections, textile reinforcement for such sections comprising in at least one of said sections transversely arranged fine parallel fibers embedded in and vulcanized to the rubber to render it laterally incompressible, and a cover of rubber and textile material wrapped around said belt and vulcanized thereto.

4. In a V-shaped belt, a neutral axis section comprising a metal mesh band composed of transversely interlooped strands the loops of each strand being arranged in zig-zag form, said band having interstices sufficiently large to permit the deformation and flow of rubber therethrough and there around, a rubber body vulcanized within and on either side of said mesh to form compression and tension sections, textile reinforcement for such sections comprising in at least one of said sections transversely arranged fine parallel fibers embedded in and vulcanized to the rubber to render it laterally incompressible, a cover of rubber and textile material wrapped around said belt and vulcanized thereto, and teeth formed in said belt.

5. In combination in a V belt of a compression section of rubber and transversely arranged fine parallel fibers forming a laterally incompressible section, a neutral axis section of rubber vulcanized to and within an inextensible flexible metal mesh layer composed of transversely interlooped strands the loops of each strand being arranged in zig-zag form, the interstices of which are sufficiently large to permit the free vertical flow of the rubber, and a plurality of layers of rubber embedded textile material mounted therein forming a tension section that is longitudinally inextensible and laterally incompressible so that said belt can pass around small diameter pulleys without setting up undue stress in the body of the belt.

ABRAHAM L. FREEDLANDER.